(12) United States Patent
Vainer

(10) Patent No.: US 12,502,723 B2
(45) Date of Patent: Dec. 23, 2025

(54) TWO-CHANNEL DEVICE FOR TWO-FREQUENCY ARC WELDING

(71) Applicant: Shimon Vainer, Be'er Sheva (IL)

(72) Inventor: Shimon Vainer, Be'er Sheva (IL)

( * ) Notice: Subject to any disclaimer, the term of this patent is extended or adjusted under 35 U.S.C. 154(b) by 0 days.

(21) Appl. No.: 19/037,757

(22) Filed: Jan. 27, 2025

(65) Prior Publication Data

US 2025/0170665 A1   May 29, 2025

Related U.S. Application Data

(63) Continuation-in-part of application No. 17/722,373, filed on Apr. 17, 2022, now abandoned.

(60) Provisional application No. 63/329,529, filed on Apr. 11, 2022.

(51) Int. Cl.
*B23K 9/067* (2006.01)
*B23K 9/073* (2006.01)

(52) U.S. Cl.
CPC ............ *B23K 9/067* (2013.01); *B23K 9/0734* (2013.01)

(58) Field of Classification Search
CPC ............................ B23K 9/0738; B23K 9/0672
See application file for complete search history.

(56) References Cited

U.S. PATENT DOCUMENTS

| 5,954,985 A | 9/1999 | Scott et al. |
| 6,156,999 A | 12/2000 | Ignatchenko et al. |
| 10,967,451 B2 | 4/2021 | Knoener et al. |
| 2021/0053134 A1* | 2/2021 | Hanka ................. B23K 9/0731 |

FOREIGN PATENT DOCUMENTS

| IL | 178413 A * | 9/2011 |
| WO | 2014041050 A1 | 3/2014 |

* cited by examiner

*Primary Examiner* — Steven W Crabb
*Assistant Examiner* — Dilnessa B Belay
(74) *Attorney, Agent, or Firm* — The Roy Gross Law Firm, LLC; Roy D. Gross

(57) ABSTRACT

Methods and devices for two-channel welding arc ignition and, more particularly, to ionizing an area of a contact between an electrode and articles to be welded. Methods and devices for igniting an arc discharge and welding.

10 Claims, 2 Drawing Sheets

TWO-CHANNEL DEVICE FOR TWO-FREQUENCY ARC WELDING

CROSS-REFERENCE TO RELATED APPLICATIONS

This application is a Continuation-in-Part Application of U.S. patent application Ser. No. 17/722,373, filed Apr. 17, 2022, which claims the benefit of priority of U.S. Provisional Patent Application No. 63/329,529, filed on Apr. 11, 2022, the contents of which are all incorporated herein by reference in their entirety.

FIELD OF THE INVENTION

The present invention relates to welding arc ignition and, more particularly, to ionizing an area of contact between an electrode and articles to be welded.

BACKGROUND OF THE INVENTION

WO2014041050 discloses an ignition system having: a high voltage generator, in particular a step-up transformer, with a primary side and a secondary side; an electrical energy source which can be connected to the primary side; and a spark gap which is designed to carry a current transferred by the step-up transformer to the secondary side. The step-up transformer has a bypass for transferring electrical energy from the electrical energy source to the secondary side. The bypass is designed to support a diminishing electrical signal in the secondary coil of the high-voltage generator after a predefined time or once a predefined current intensity of the current has been reached. Use of high-voltage discharges for igniting an arc is dangerous for a welder. In addition, this kind of the ignition system interferes in operation of radio and TV and other electronic devices. Nowadays, the ignition systems of this kind are prohibited for use.

U.S. Pat. No. 6,156,999 discloses a method and a device for welding arc ignition of an arc welding apparatus providing a reduced level of high frequency disturbances. A welding electrode and a workpiece are connected with a welding power source and to at least two additional high voltage power sources. A short a periodic high voltage pulse is transmitted from the first high voltage power source to a gap present between the welding electrode and the workpiece, to break down the air present between the welding electrode and the workpiece, and to create a current conducting duct therebetween. The current output of the high voltage power source is restricted in amplitude and rate of rise. The short non-periodic high voltage pulse is superimposed by another, long, high voltage pulse from the second high voltage power source. The long pulse has a current rate of rise not exceeding that of the short pulse, and the open circuit voltage of the second high voltage power source is lower than that of the first high voltage power source. A stretched pulse appears, and the duration of the current discharge increases. The current conducting duct is heated, its electric resistance decreases and an arc is ignited. When the voltage in the current conducting duct decreases to a value less than that of the open circuit of the welding power source, the current starts flowing through the welding electrode and arc to the workpiece, resulting in a welding arc burning from the welding power source.

In the course of ignition an arc discharge, atmospheric air or other gas is ionized in proximity of a contact point of an electrode and articles to be welded by providing a predetermined amount of energy. In a contactless type of ignition, energy is input in a pulsed manner down to a breakdown of a small gap. The ignition process is characterized by high energy input rate and emitting electromagnetic radiation of a wide spectrum.

Therefore, there is a long-felt and unmet need for providing reliable ignition and smooth stable arc discharge by applying high-frequency energy to the welding arc and improving welding quality. The high-frequency energy can be applied not only at the step of ignition but also throughout the welding process.

SUMMARY OF THE INVENTION

It is hence one object of the invention to disclose method of igniting an arc discharge and welding thereby. The aforesaid method comprises steps of: (a) providing a two-channel device for igniting an arc discharge and welding thereby; said two-channel device comprising: (i) a first channel further comprising: (1) a power supply further comprising a power transformer; and a controller of said power transformer;
(ii) a second channel further comprising: (1) a high-frequency generator; and (2) a resonant circuit connected in series to said high-frequency generator; said first channel comprises a timer configured for switching on said power transformer after a predetermined delay; said second channel comprises a current meter configured for measuring a high-frequency current; said current meter is connected to said timer and triggers said timer;
(iii)) output terminals connectable to an electrode and a welding stand; said first and second channels are connectable to said output terminals in parallel manner; (b) placing articles to be welded onto said welding stand; (c) connecting said electrode and welding stand to said output terminals; (d) contacting said electrode with at least one of said articles to be welded; (e) applying a high-frequency voltage generated by said high-frequency generator to said electrode; (f) after a predetermined delay applying a welding voltage from said power transformer to said electrode.

Another object of the invention is to disclose said step of providing said device for igniting an arc discharge and welding thereby comprises providing said power supply and igniting and stabilizing means further comprising a power rectifier and a high-frequency rectifier, respectively.

A further object of the invention is to disclose said power transformer having an open-circuit output voltage ranging between 30 and 32V.

A further object of the invention is to disclose said high-frequency voltage which is a rectangular voltage ranging between 40 and 60V at frequency ranging between 35 and 40 kHz and power ranging between 250 and 300 W.

A further object of the invention is to disclose said predetermined delay ranging between 1 and 2 sec.

A further object of the invention is to disclose a two-channel device for igniting an arc discharge and welding thereby. The aforesaid two-channel device comprises: (a) a first channel further comprising: (i) a power supply further comprising a power transformer; and (ii) a controller of said power transformer; (b) a second channel further comprising: (i) a high-frequency generator and (ii) a resonant circuit connected in series to said high-frequency generator; said first channel comprises a timer configured for switching on said power transformer after a predetermined delay; said second channel comprises a current meter configured for measuring a high-frequency current; said current meter is connected to said timer and triggers said timer; (c) output terminals connectable to an electrode and a welding stand; said first and second channels are connectable to said output terminals.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a device for arc welding and a method of implementing the same.

Figure 1:
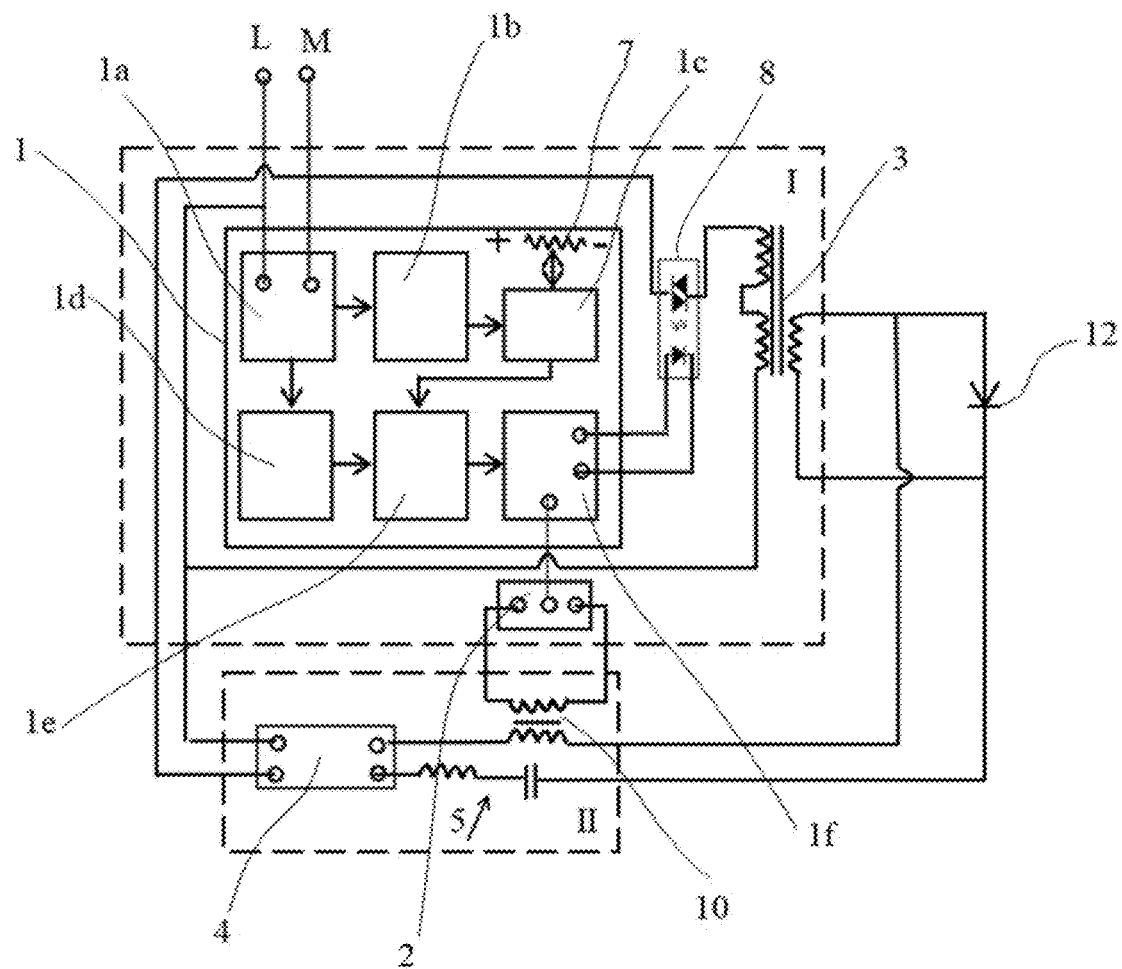
FIG. 1 is an electrical circuit diagram of a device for arc welding.

Reference is now made to FIG. 1 presenting an electrical circuit diagram of a two-channel AC device for arc welding. First channel I comprises controller 1, triac 8, and power transformer 3. Controller 1 further comprises:
1. pulse shaper 1a providing synchronizing pulses at x-tuple phase points corresponding to zero value of mains voltage;
2. shaper 1b providing a synchronized sawtooth voltage;
3. shaper 1c providing rectangular pulses having synchronized leading pulse edges and tailing edges corresponding to a phase point when the sawtooth voltage achieves a preset voltage controlled by potentiometer 7;
4. 3 kHz pulse generator 1d;
5. logic NAND gate 1e providing bursts of pulses; and
6. amplifier 1f configured for amplifying the pulsed provided by logic NAND gate 1e.

The amplified pulses are transmitted to triac 8. The primary winding of power transformer 3 is connected to mains via triac 8.

Second channel II comprises high-frequency generator 4 and resonant circuit 5. Generator 4 produces voltage with a frequency of 30-40 kHz, an amplitude of 40-60V, and a power of 250-300 W. Resonant circuit 5 is tuned by means of a ferrite core at the resonance frequency with generator 4. After the tuning procedure, the position of the ferrite core is locked. In order to increase the quality of resonant circuit 5, the inductive coil is wound of a multi-core conductor. Each wire is electrically isolated from the other ones. The purpose of the tuning procedure is to reach a maximal active power in the second channel II. As shown in FIG. 1, amplifier 1f is controlled by timer 2, which is configured for delaying energization of power transformer 3 with an open-circuit output voltage of 30-32 V. Timer 2 is activated by current meter 10 measuring the current in high-frequency channel II. When ignited after triggering timer 2, a two-frequency arc is established.

When the electrode touches an article, the high-frequency voltage creates a current in the area of contact. The current detected by current meter 10 activates timer 2 with a preset delay. Heating of the electric contact area is required for ionization of the gases in proximity of it and defined by the preset time delay ranging between 1 and 2 sec. Finally, a welding arc is ignited after energizing low-frequency power transformer 3 by timer 2.

After turning on the welding device, and touching the article to be welded by the electrode a high-frequency current generated in channel II is established. Concurrently with it, the high-frequency voltage is fed into timer 2 via meter 10. Timer 2 is configured for activating low-frequency power transformer 3 such as a low-frequency of first channel I into the area of article to be welded touched by electrode. It should be emphasized that interference caused by an ignition of the two-frequency arc is negligible in comparison with the welding devices known in the art.

According to one embodiment of the present invention, power transformer 3 has transformation ratio equal to 7.5 in order to obtain on output voltage not higher than 30-32V. Energy is supplied to welding stand 12 from power transformer 3 and generator 4. Combining high- and low-frequency voltages at the output of power transformer 3 allows decrease in turning number the secondary winding of transformer 3. Reliable arc ignition is maintained because:
1. The total open circuit voltage at the output of power transformer 3 reaches 80 volts.
2. Power transformer is switched on by a timer with a delay of 1-1.5 sec. after bringing into contact the electrode and the article to be welded which results in heating a surrounding area and creating a required ionized zone therearound.
3. The skin effect created by the high-frequency current at the contact point causes rise in current density within the arc discharge and, as the result, additional increase in temperature and ionization in the surrounding area. The ionized gases from the flux located at the end of the electrode take an active part in welding process.

Therefore, by the moment energizing power transformer 3, optimal conditions required for ignition of arc high-frequency discharge are created. The reliability of the ignition depends on the current produced by the generator, the time delay provided by timer 2, and the thermal conductivity of the welded metal. It was experimentally shown that a welding current of 10 A and time delay of 1 sec provide a failure-free ignition of the arc discharge on samples of various types of steel with a thickness of 25 mm or more. It should be emphasized that the high-frequency current is free of steep edges and spark discharges such that electromagnetic interference is minimized. The delay of the specific welding device is determined experimentally by gradually increasing the value of delay provided by timer 2. According to the present invention, the preferred value of delay is the minimal time providing reliable ignition of the welding arc.

The weld seam provided by a two-frequency arc is characterized by higher quality, welding which is explained by the following. The welding arc energized by a convenient power transformer by a succession of half-cycles of voltage. In other words, in the AC arc, the voltage between the electrode and the article to be welded is fed in a pulsed manner bringing about an arc break when the sin voltage at the arc drops lower than the ionization threshold. As a result, the shape of the welder seam is distorted. According to the present invention, in the welding area, the high-frequency voltage generated in second channel II creates additional ions and electrons, which increase the ionization degree in the arc and prevent the arc from the arc break. The two-frequency AC arc of the present invention provides the welder seams comparable in quality with the welder seams of DC welding.

It should be noted that there is no need for powerful reactive elements for suppressing the short-circuit current at the start of welding because power transformer 3 is turned on with time delay when the welding area is heated and created in the welding area is characterized by high electrical resistance and limits the welding current at the moment of arc ignition.

The arc discharge combined with high-frequency plasma is characterized by increased temperature and energy concentration, enhanced stability, as a result, improved quality of welding. In particular, roughness of welded surfaces is significantly reduced.

Figure 2A:
FIGS. 2a and 2b are photographs of welds made by an AC device for arc welding according to the present invention and a conventional AC device for arc welding, respectively.
Figure 2B:
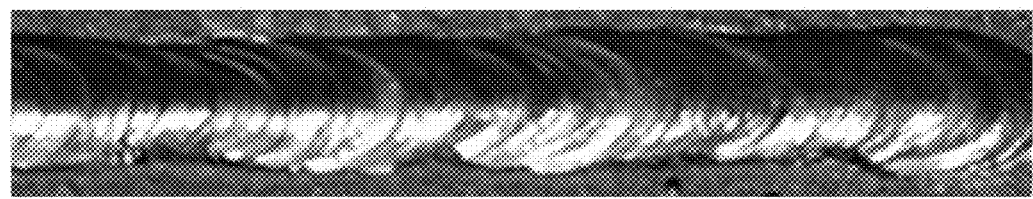

Reference is now made to FIGS. 2a and 2b showing experimental welds made at alternating current be means of a combined high-frequency plasma-arc welding and by a standard arc welding.

During dual-frequency welding, a high-frequency component also appears in the arc plasma. Through the mask, you can see that the plasma brightness becomes lighter and brighter, which indicates a higher radiation spectrum and a higher temperature. This causes increased arc concentrations and, as a result, the quality of welded seams is more stable. The surface of the seam becomes smoother. In the case of welding with a short arc or welding within in the weld pool by means of an immersed electrode, electrode sticking is eliminated. The present invention enables obtaining thin seams at a low welding current without electrode sticking and welding thin sheets of metal without anti-stick systems (U.S. Pat. No. 10,967,451). In addition, metal spatter during welding is reduced. (See FIG. 2a). The two-frequency arc operating without any constant current component is free from arc magnetism being inherent to a DC arc. This technical feature of the two-frequency arc simplifies welding technology and increases the accuracy of the welded seams.

The present invention does not include reactive elements used in known AC devices for creating a drooping voltage characteristic and regulating the current and provides cos φ=1 in a wide range of loads which results in significant energy savings.

Turning on the transformer takes place with a delay of 1-1.5 seconds after the timer is triggered, which is switched on when appearance the current produced by the generator when the metal touches the electrode.

4. At the specified frequency of the generator, a significant skin effect occurs and causes an increase in the current density on the surface of the end of the electrode and the adjacent surface of the product. The skin effect accelerates the temperature rise at the point of contact and the formation of high-frequency plasma. Plasma formation is also facilitated by emission of ionized gases from the molten flux located at the end of the electrode.

5. Turning on transformer 3 provides an arc with a two-frequency plasma, specifically, at a mains frequency and at the frequency of the generator.

6. High-frequency plasma makes the arc elastic. The arc does not break when the electrode is breaks off by 15=20 mm at a low voltage of the transformer.

7. High-frequency plasma increases arc stability and concentration by reducing random variations in weld width and height, making the weld surface smoother. This improves weld quality. The presence of this plasma also reduces spatter.

8. The device eliminates the no-load current of the transformer, since it turns on after the delay required for the ignition of the arc.

9. Welding with additional high-frequency plasma prevents the electrode from sticking at any given welding current, which allows welding thin sheets When welding, the electrode can move along the surface of the bath and welding can be performed with the electrode immersed in the bath. Thus, in transformer sources, the need for special anti-stick system is not required.

10. Despite there are no power reactive elements in the device, when the transformer is turned on, a large short-circuit current does not arise, since there is already a section in the circuit with a high temperature and an increased resistance of the ionized zone 11. For direct current welding, additional elements are introduced into the device: a rectifier connected to transformer and calculated for the maximum welding current, the input of which is connected to the output of the transformer and a rectifier for a current of 20 A, the input of which is connected to the output of the resonant circuit and to the generator. The outputs of the rectifiers are connected in parallel through an inductor. Outputs of them connected to electrode. Inductor used for accumulation of energy during welding and an increase in the ignition voltage when the electrode is torn off at the end the weld.

12. The proposed method and device expands the technological capabilities of transformer sources and improves the quality of welding of steel structures on alternating current, which is not inferior to welding of similar structures on direct current. In addition, the proposed device can significantly simplify welding transformers by replacing on power transformers with cos φ close to 1, what should be especially interest to companies producing at welding transformers.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method of igniting an arc discharge and welding thereby; the method comprising steps of:
  a. providing a two-channel device for igniting an arc discharge and welding thereby; the two-channel device comprising:
    i. a first channel further comprising:
      1) A power supply further comprising a power transformer; and
      2) A controller of the power transformer configured to provide a reduced, arc-sustaining voltage and a full welding voltage;
    ii. a second channel further comprising:
      1) A high-frequency generator; and
      2) A resonant circuit connected in series to the high-frequency generator;
    iii. a current meter within the second channel, configured to measure a high-frequency current, wherein the measured high-frequency current provides an indication of a degree of ionization of a contact zone between an electrode and an article to be welded, and wherein the controller is configured to automatically apply the full welding voltage after a variable delay, the delay being determined in response to the measured high-frequency current; and iv. output terminals connectable to an electrode and a welding stand; the first and second channels are connectable to the output terminals in parallel;
b. placing articles to be welded onto the welding stand;
c. connecting the electrode and welding stand to the output terminals;
d. contacting the electrode with at least one of the articles to be welded;
e. applying a high-frequency voltage generated by the high-frequency generator to the electrode while simultaneously providing the reduced, arc-sustaining voltage from the power transformer, thereby causing a combined current from both channels to heat an area of contact; and
f. after the variable delay, determined based on the measured high-frequency current, applying the full welding voltage from the power transformer to the electrode to establish a dual-frequency welding arc.

2. The method according to claim 1, further comprising rectifying an output of the first channel with a power rectifier and rectifying an output of the second channel with a high-frequency rectifier to provide a dual-frequency current for welding.

3. The method according to claim 1, wherein the power transformer has an open-circuit output voltage ranging between 30 and 32V.

4. The method according to claim 1, wherein the high-frequency voltage is a rectangular voltage ranging between 40 and 60V at frequency ranging between 35 and 40 kHz and power ranging between 250 and 300 W.

5. The method according to claim 1, wherein a duration of the delay between the application of the reduced, arc-sustaining voltage and the restoration of the full welding voltage is automatically determined based on a degree of ionization of the contact zone, as indicated by a high-frequency current measured by the current meter, and wherein the duration is in a range between 1 and 2 seconds.

6. A two-channel device for igniting an arc discharge and welding thereby; the two-channel device comprising:
a. a first channel further comprising:
i. a power supply further comprising a power transformer; and
ii. a controller configured to operate the power transformer initially at a reduced, arc-sustaining voltage, and subsequently to restore a full welding voltage;
b. a second channel further comprising:
i. a high-frequency generator; and
ii. a resonant circuit connected in series with the high-frequency generator; and
iii. a current meter configured to measure a high-frequency current associated with a contact zone between an electrode and an article to be welded; and
c. output terminals connectable to an electrode and a welding stand, wherein said first and second channels are connected in parallel to the output terminals;
wherein the controller is configured to restore the full welding voltage after a variable delay that is automatically determined in response to the measured high-frequency current, indicative of a degree of ionization of the contact zone, such that the high-frequency generator and the reduced-voltage power transformer operate concurrently to synergistically preheat and ionize the contact zone prior to initiation of the full welding arc.

7. The device according to claim 6, further comprising a power rectifier connected to an output of the first channel and a high-frequency rectifier connected to an output of the second channel, wherein outputs of the rectifiers are connectable in parallel to the output terminals to provide a dual-frequency current for welding.

8. The device according to claim 6, wherein the power transformer has an open-circuit output voltage ranging between 30 and 32V.

9. The device according to claim 6, wherein the high-frequency voltage is a rectangular voltage ranging between 40 and 60V at frequency ranging between 35 and 40 kHz and power ranging between 250 and 300 W.

10. The device according to claim 6, wherein the variable delay prior to restoring the full welding voltage is determined based on a measured high-frequency current associated with the contact zone, the current being indicative of a degree of ionization of the contact zone, and wherein the variable delay is within a range of 1 to 2 seconds.

* * * * *